Feb. 15, 1938.   H. C. DEMPSEY   2,108,655
DEGERMINATOR
Filed June 29, 1936   3 Sheets-Sheet 3

INVENTOR
H. C. DEMPSEY
By J. G. Cook
ATTORNEY

Patented Feb. 15, 1938

2,108,655

UNITED STATES PATENT OFFICE 2,108,655

DEGERMINATOR

Henry Clay Dempsey, Decatur, Ill., assignor to The Beall Improvements Company, Inc., Decatur, Ill., a corporation of Illinois Application June 29, 1936, Serial No. 87,906

1 Claim. (Cl. 83—31)

This invention relates generally to degerminators, and more specifically to a degerminator intended for use in corn, cereal, hominy, and grit mills for breaking and hulling corn and removing the germ therefrom, the predominant object of the invention being to provide a corn degerminator which, because of improved details of construction, performs its intended function in a more efficient manner than did other corn degerminators heretofore known.

Figure 1:
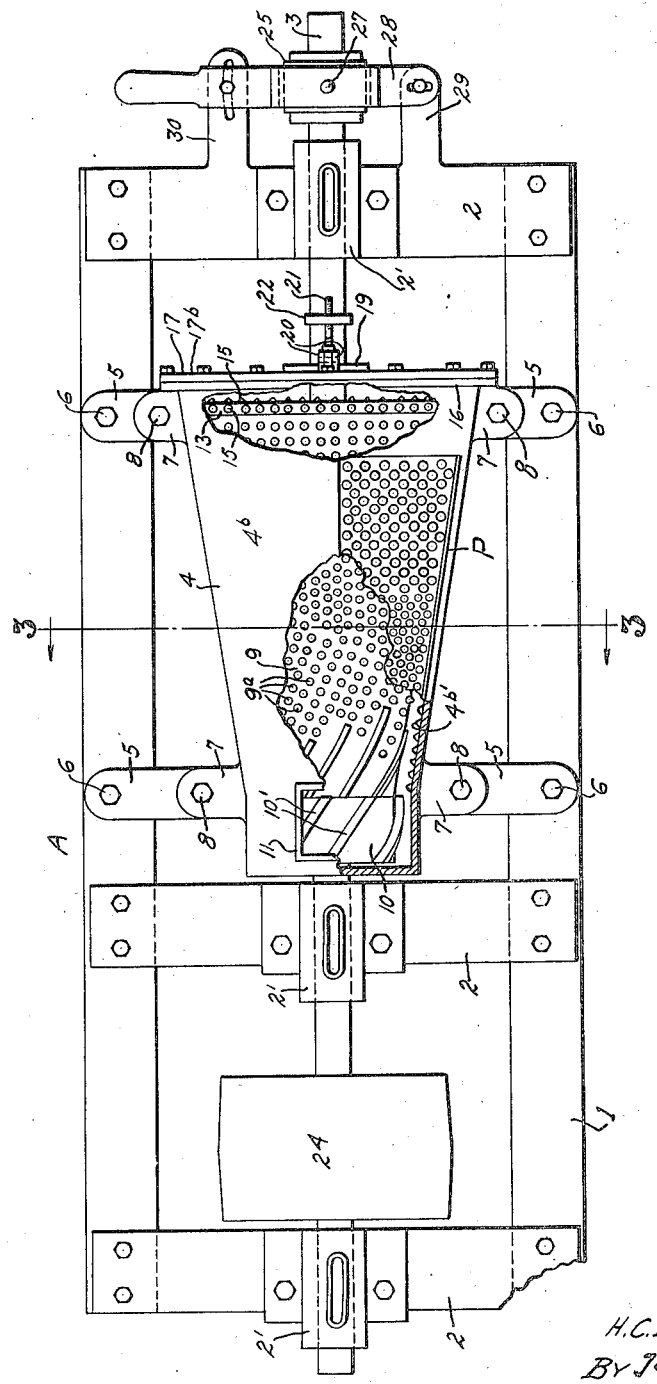
Fig. 1 is a plan view of the improved degerminator with parts of the casing thereof broken away so as to illustrate interiorly located parts of the degerminator, which would be otherwise hidden.

In the drawings, wherein is shown for the purpose of illustration, merely, one embodiment of the invention, A designates the improved degerminator generally. The degerminator includes a suitable supporting frame 1 provided with cross bars 2, these cross bars having suitable bearings 2' mounted thereon which rotatably support a horizontally arranged shaft 3 which extends longitudinally of the degerminator. Fixedly supported by the frame 1 is a casing 4, said casing comprising a lower casing section 4ª and an upper casing section 4ᵇ. The lower casing section 4ª is provided with pairs of members 5 which extend outwardly from said casing section in opposite directions, and these members are secured at their outer ends to the frame 1 by fastening devices designated by the reference character 6. The upper casing section 4ᵇ is provided with similarly located pairs of outwardly extended ears 7 which are secured by suitable fastening devices 8 to the members 5 of the lower casing section 4ª. Because of this arrangement of the casing, the upper section thereof may be removed when desired to give access to the interior of the casing.

Figure 2:
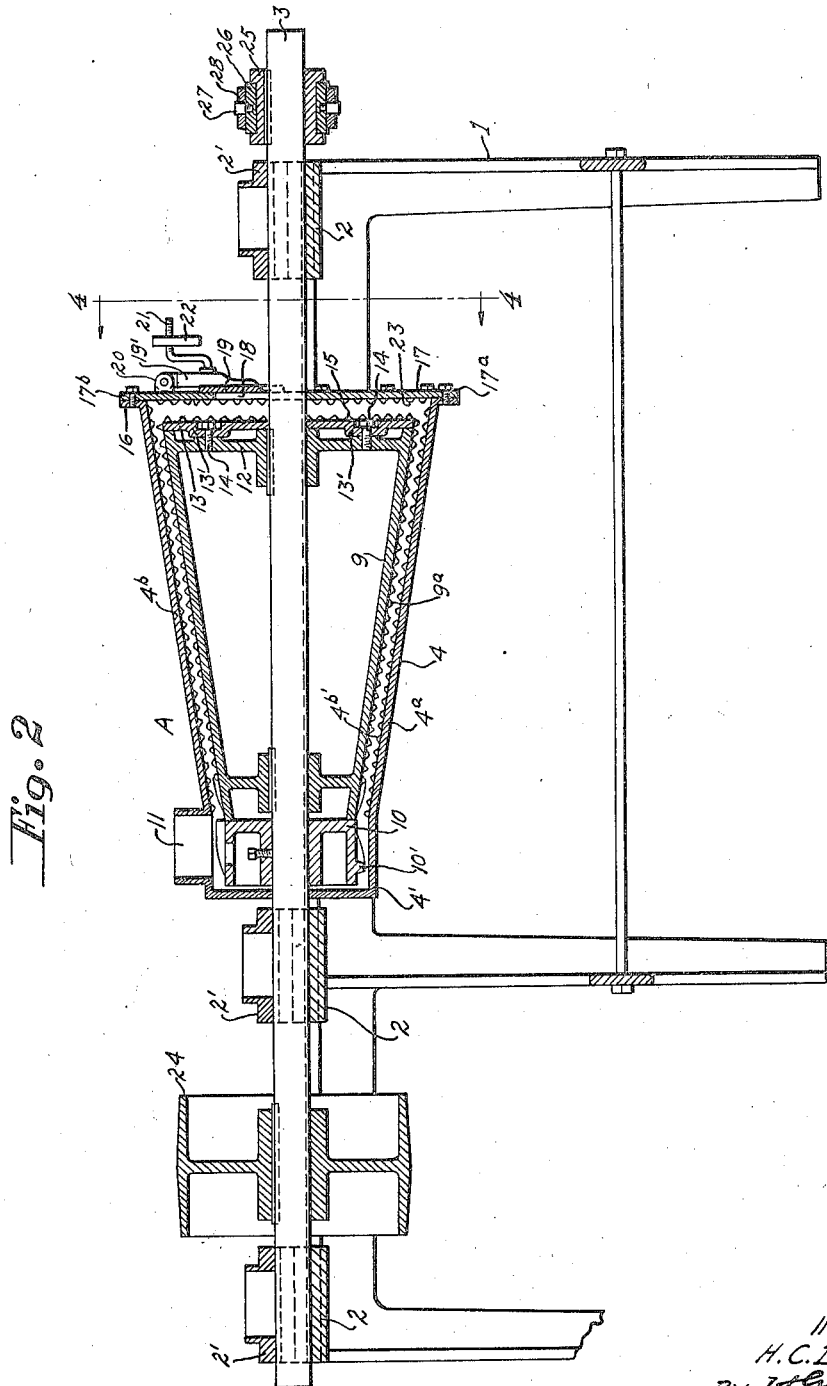
Fig. 2 is a vertical section of the degerminator illustrated in Fig. 1.
Figure 3:
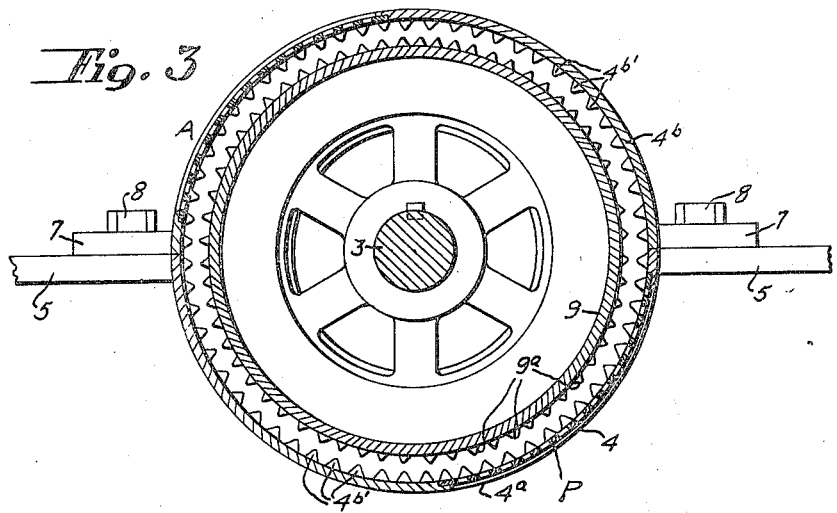
Fig. 3 is a cross-section of the degerminator taken approximately on the line 3—3 of Fig. 1.

As will be seen by referring to Figs. 1 and 2, the casing 4 is substantially cone-shaped, and fixedly mounted on the shaft 3 so that it is located within said casing is a substantially cone-shaped cylinder 9. The cone-shaped cylinder is preferably of hollow construction and the circumferential face thereof is arranged in substantially parallel, spaced apart relation relative to the inner faces of the curved walls of the casing sections which provide the casing 4. At the smaller end of the cone-shaped cylinder 9 a feeding element 10 is arranged, said feeding element being fixed to the shaft 3 and being provided with ribs 10' arranged obliquely in such direction as to feed grain toward the larger end of the cone-shaped cylinder 9. The casing 4 includes an untapered portion 4' in which the feeding element 10 is disposed, and this casing portion 4' is provided with a grain inlet 11 through which grain is introduced into the interior of the casing. The inner face of the cone-shaped portion of the casing 4 and the circumferential face of the cone-shaped cylinder are provided with projections 4ᵇ' and 9ª, respectively, the projections 4ᵇ' extending inwardly and the projections 9ª extending outwardly.

At the larger end of the cone-shaped cylinder 9 said cylinder is provided with a solid end wall 12 which is located inwardly of the extreme outer end of the cylinder, and for convenience in describing the invention this end wall will be called the inner end wall. Secured to the inner end wall 12 of the cone-shaped cylinder is an outer end wall 13, bolts or other suitable fastening devices 14 being employed to securely fix the outer end wall 13 to the inner end wall 12. The outer end wall is provided with rearwardly extended portions 13' provided with cavities or depressions in which the heads of the bolts 14 are located. The outer end wall is provided at its circumferential face and throughout its entire rear face with outwardly extended projections 15. The projections 15 are in the form of cones or pyramids. This is true also of the projections 4ᵇ' and 9ª formed on the inner face of the casings 4 and on the outer face of cylinder 9.

Figure 4:
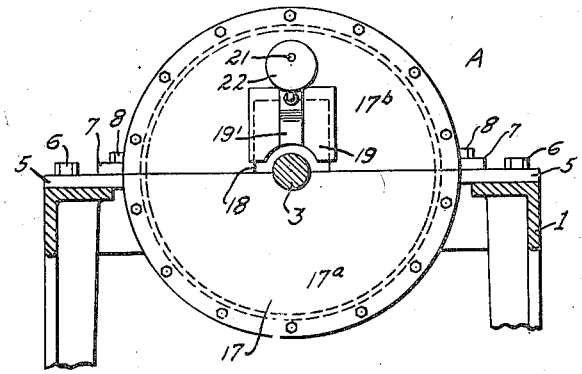
Fig. 4 is an enlarged section on line 4—4 of Fig. 2 looking in the direction of the arrow.
Figure 5:
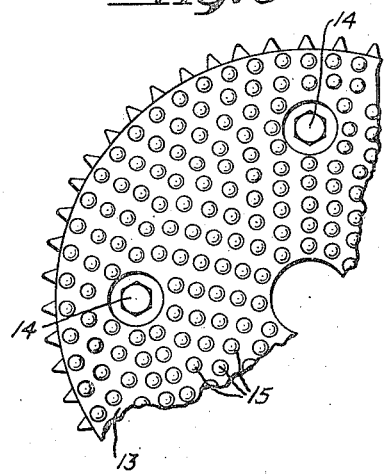
Fig. 5 is a fragmentary view of the end plate of the cylinder of the degerminator.
Figure 6:
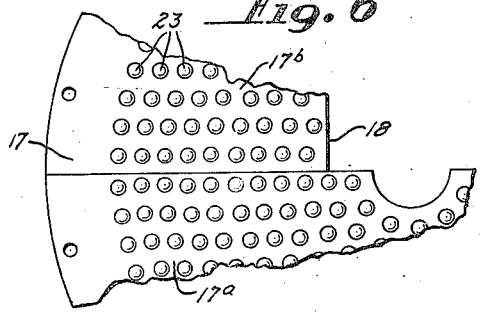
Fig. 6 is a fragmentary view of the associated end plates of the casing of the degerminator.

The casing 4 at its larger end is provided with an outwardly extended, annular flange 16 to which is bolted or otherwise secured a structure 17 which provides the end wall of the casing. The structure 17 is comprised of two parts 17ª and 17ᵇ, the dividing line of the two parts of the structure 17 being extended horizontally in alinement with the center of the shaft 3, as shown most clearly in Fig. 4. The part 17ª of the structure 17 is continuous and imperforate except for a half-circular opening through which the lower portion of the shaft 3 extends. The upper part 17ᵇ of said structure 17, however, is provided with a rectangular opening 18 which constitutes the outlet or discharge opening for grain passing from the degerminator. The grain discharge opening 18 is disposed immediately above the shaft 3 (Figs. 2 and 4). The discharge opening is closed by a gate 19 which is hingedly suspended by an arm 19' from ears 20 which extend outwardly from the upper part 17ᵇ of the structure 17. The arm 19' has fixed to it an angularly bent rod 21 which is provided with a screw-threaded portion on which a weight 22 is mounted. The weight 22 may be adjusted longitudinally of the screw-threaded portion of the rod 21 so as to increase or decrease the amount of pressure necessary to swing the gate to an open position.

The inner faces of the parts 17ᵃ and 17ᵇ of the structure 17 are provided with inwardly extended projections 23. These projections extend toward the projections 15 formed on the outer end wall 13 of the cylinder 9. The projections 23, as in the case of the projections 15, 4ᵇ', and 9ᵃ are in the form of cone or pyramid shapes and any desired dimensions.

The shaft 3 has fixed to it a suitable pulley 24 which receives a power transmission belt (not shown) whereby rotary motion may be transmitted to the shaft. Also, the shaft 3 has associated therewith means for adjusting said shaft longitudinally of its axis in order that the distance between the outer face of the cone-shaped cylinder and the inner face of the casing may be varied to suit the kind and condition of grain under treatment and insure proper breakage of said grain. The means preferably employed to shift the shaft lengthwise comprises a collar 25 fixed on the shaft 3. The collar 25 is provided with an annular circumferential groove in which a split collar 26 is disposed, the sections of this split collar being provided with trunnions 27 which are received by openings formed in portions of a lever 28. The lever 28 is pivoted to a fixed bracket 29 located at one side of the shaft 3 and is swingably adjustable relative to a bracket 30 located at the opposite side of the shaft. It is obvious that by swinging the free end of the lever 28 the shaft 3 will be moved longitudinally of its axis.

In operating the improved degerminator, corn is supplied to the feeding element 10 through the inlet opening 11 and said corn is forced by the oblique ribs of the feeding element onto the smaller end of the cone-shaped cylinder. The cone-shaped cylinder is adjusted with relation to the casing so as to cause the projections 4ᵇ' and 9ᵃ to break and scour the grains as they travel through the space between the circumferential face of the cone-shaped cylinder and the inner face of the casing. As already stated herein, the space between the circumferential face of the cone-shaped cylinder and the inner face of the casing may be varied for grains of different kinds and conditions by shifting the shaft 3 longitudinally of its axis. The stock being treated passes through the space between the cone-shaped cylinder and the casing and rises to the level of the discharge opening 18 in the space between the outer end wall 13 of the cone-shaped cylinder 9 and the end plate provided by the structure 17 of the casing. When the grain within the machine exerts the necessary pressure against the gate 19 said gate will be swung open and the grain will be discharged from the machine through the discharge opening.

An important feature of the present invention is that the improved degerminator does not include the retarding ring formerly present in machines of this type. These retarding rings made it necessary that considerable additional power be expended in operating degerminators provided with such retarding rings, and also these retarding rings caused the degerminators so equipped to break the grains into very small particles, which was objectionable. By eliminating the retarding rings I do away with the disadvantages encountered in connection with the use thereof and thus provide a degerminator which is capable of more efficient operation with less power than heretofore.

By eliminating the retarding ring the grain passes freely through the machine, and also by locating the discharge opening above the vertical center of the machine the space between the revolving cone-shaped cylinder and the stationary casing is maintained full of grain being treated up to the level of the discharge opening. Additionally by providing a space between the outer end plate 13 of the cone-shaped cylinder and the structure 17 of the casing and providing these members with projections 15 and 23, the grains moving upwardly through this space to the level of the discharge opening 18 are subjected to constant scouring and rubbing, which add to the treatment of the grains.

The casing 4 is provided with perforated plates P, preferably two in number, diametrically opposite each other, which extend approximately two-thirds of the length of said casing and occupy about one-half of the transverse space of said casing. These plates P are perforated with $\frac{7}{32}''$ perforations from about the transverse center of said plates to the larger or discharge end of the casing 4, while the other half of said plates have $\frac{1}{4}''$ perforations. The purpose of these perforated plates is to permit the escape from the casing 4 of all material ground sufficiently fine to permit the escape of same and thereby permit more material to be introduced into and be handled by my improved degerminator. In practice a wooden box casing (not illustrated) surrounds the casing 4 to catch the ground material passing through the perforated plates 4. At either end of the perforated plates P the projections 4ᵇ' are located.

I claim:

A degerminator comprising a supporting frame, a shaft supported for rotation by said frame, a tapered cylinder mounted on said shaft and rotatable therewith, a tapered casing which encloses said cylinder, the circumferential face of said tapered cylinder and the adjacent wall of said casing being spaced apart from each other to provide a space through which the grain being treated passes, cone-shaped projections on said spaced apart faces of said tapered cylinder and said tapered casing, an end wall at the larger end of said tapered cylinder, an end wall at the larger end of said tapered casing, said end walls being spaced apart from each other and said end wall of said casing having a discharge opening formed therein at a point above said shaft, projections extended into said space between said end walls of said tapered cylinder and tapered case from both of said elements, a gate for controlling passage of grain through said discharge opening, and means for hingedly supporting said gate in such manner that it may be opened by pressure thereagainst of grain within the apparatus.

HENRY CLAY DEMPSEY.